United States Patent [19]

Ippolito et al.

[11] Patent Number: 5,829,582
[45] Date of Patent: Nov. 3, 1998

[54] LASER DISK HOLDER WITH ONE TOUCH DISK DEMOUNTING

[76] Inventors: Peter M. Ippolito; Caroline M. Cook, both of 9205 Brigadoon Cove, Austin, Tex. 78750

[21] Appl. No.: 823,511

[22] Filed: Mar. 24, 1997

[51] Int. Cl.⁶ .................................................. B65D 85/57
[52] U.S. Cl. ........................ 206/308.1; 206/310; 206/804
[58] Field of Search ..................................... 206/307, 309, 206/310, 311, 312, 313, 308.1, 804

[56] References Cited

U.S. PATENT DOCUMENTS

| | | |
|---|---|---|
| 4,793,479 | 12/1988 | Otsuka et al. . |
| 4,793,480 | 12/1988 | Gelardi et al. . |
| 4,819,799 | 4/1989 | Nomula et al. . |
| 5,195,794 | 3/1993 | Hummel, Jr. et al. . |
| 5,238,107 | 8/1993 | Kownachy . |
| 5,251,750 | 10/1993 | Gelardi et al. . |
| 5,263,580 | 11/1993 | Ciba et al. . |
| 5,402,882 | 4/1995 | Bandy et al. . |
| 5,417,324 | 5/1995 | Joyce et al. . |
| 5,558,220 | 9/1996 | Gartz ................................... 206/308.1 |
| 5,660,274 | 8/1997 | Chien ................................... 206/308.1 |

*Primary Examiner*—Jacob K. Ackun

[57] ABSTRACT

A novel laser disk holder is described which permits the demounting of a laser disk that is mounted thereupon through the application of a simple one touch action. Demounting of the laser disk is achieved through the application of downward pushing force onto a center release button which has the effect of nullifying the interference fit which exists between the center opening of the laser disk and the center element onto which it is mounted upon. Resilient lifting arms then act to urge the demounted laser disk upwards and away from the top surface of the laser disk holder, thus making the laser disk available to be grasped by an individual.

13 Claims, 6 Drawing Sheets

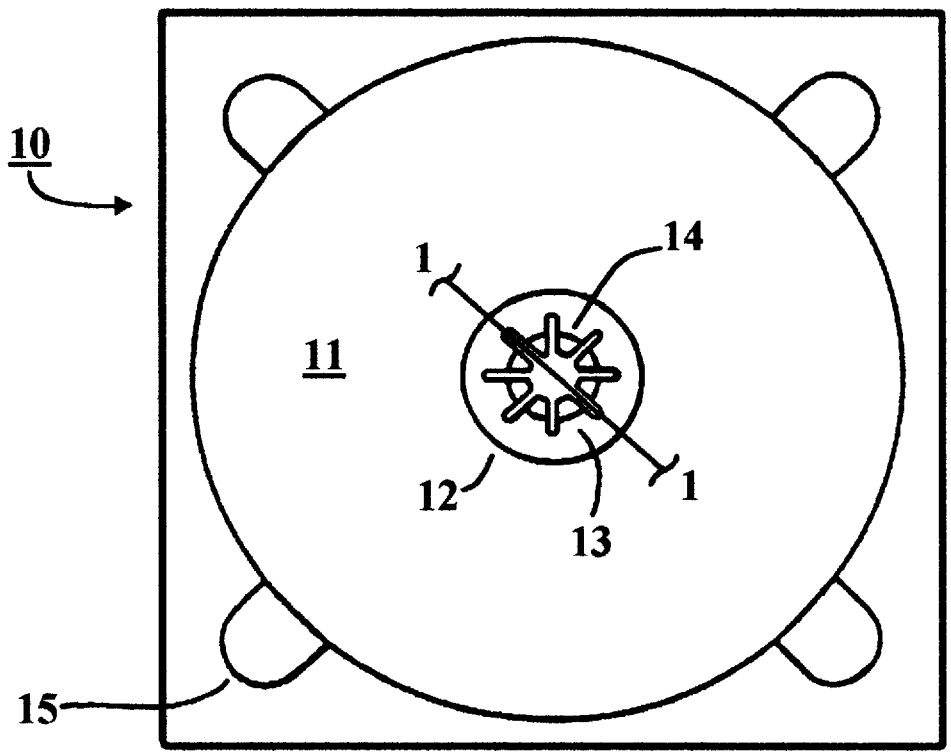
Fig. 1-A
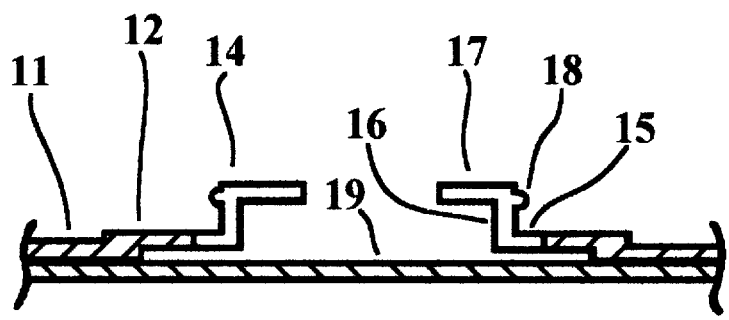
Fig. 1-B

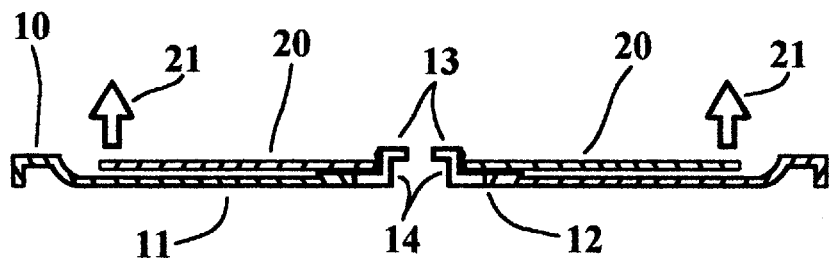
Fig. 2-A
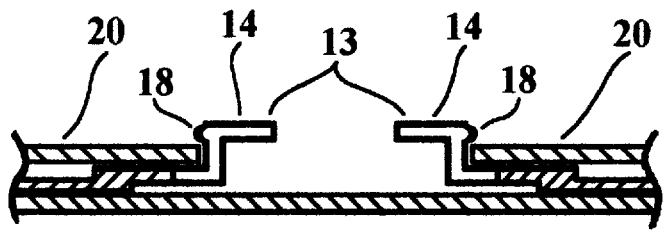
Fig. 2-B
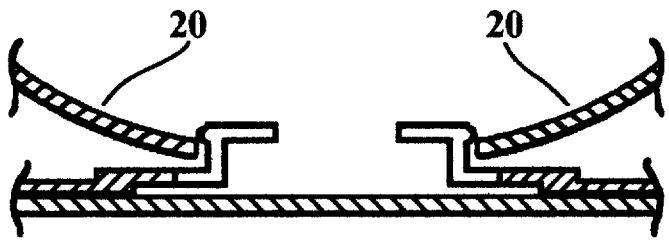
Fig. 2-C

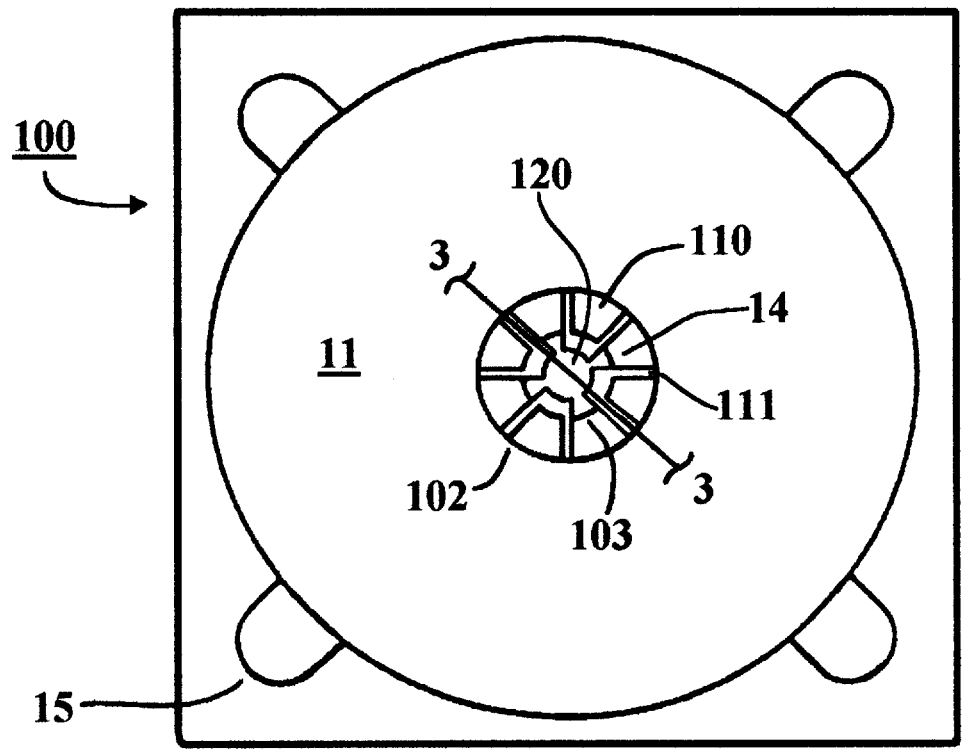
Fig. 3-A
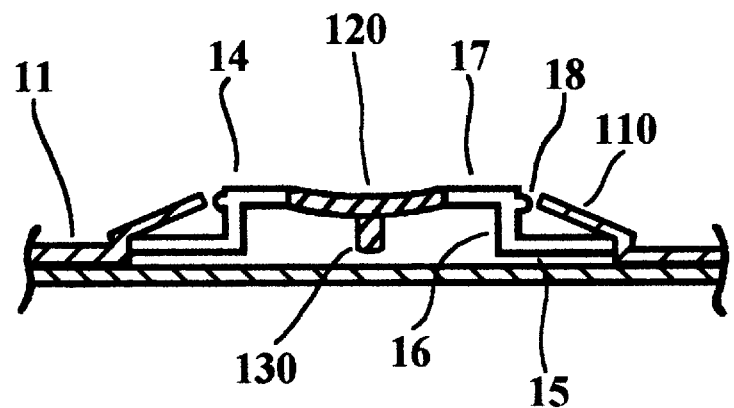
Fig. 3-B

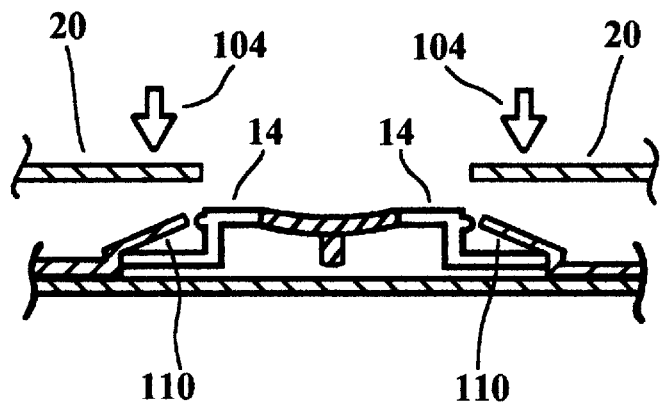
Fig. 4-A
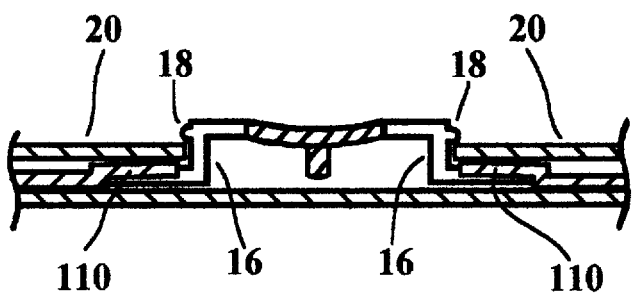
Fig. 4-B

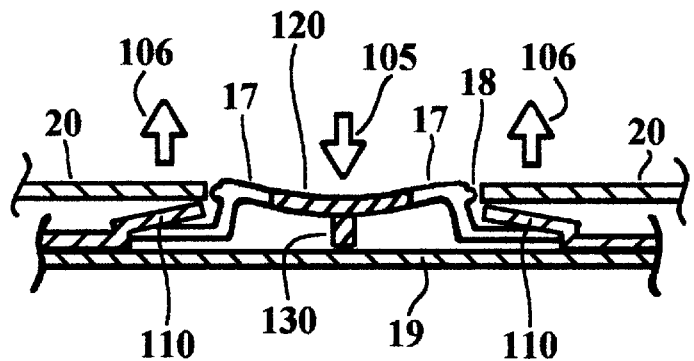
Fig. 4-C
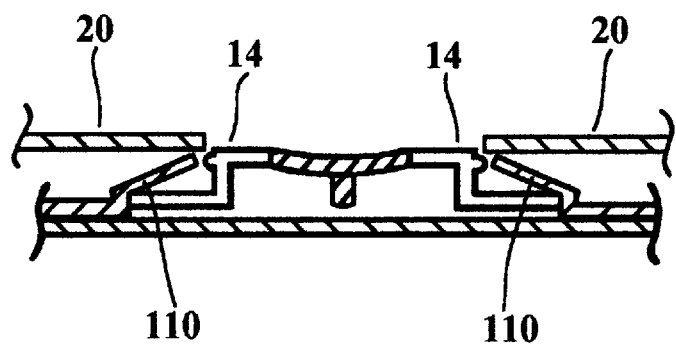
Fig. 4-D

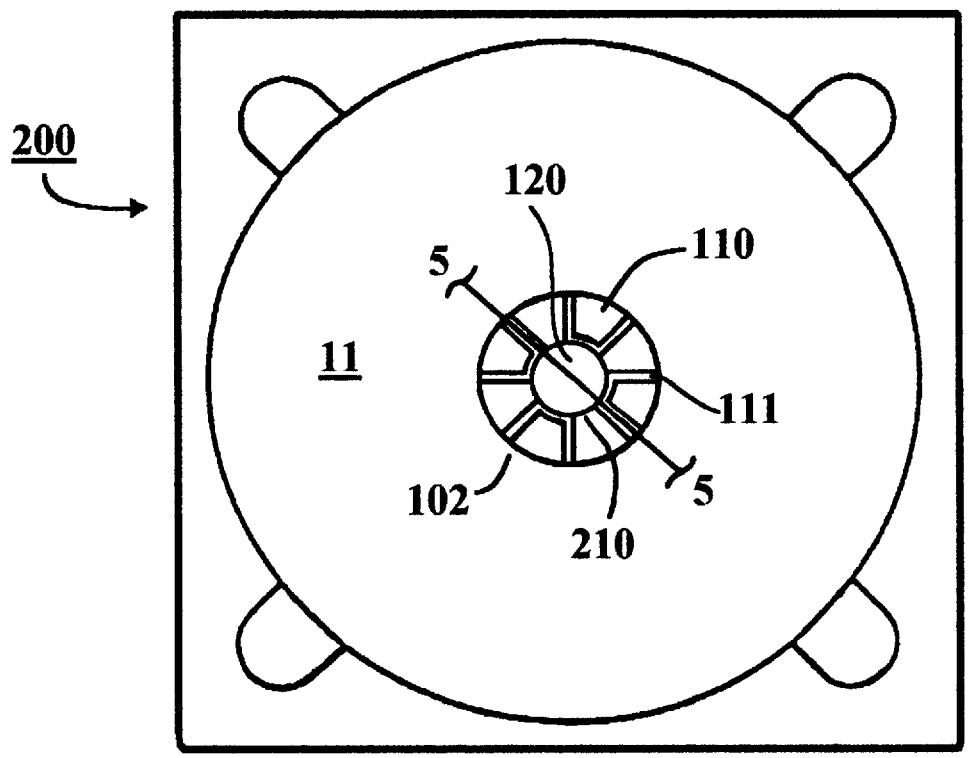
Fig. 5-A
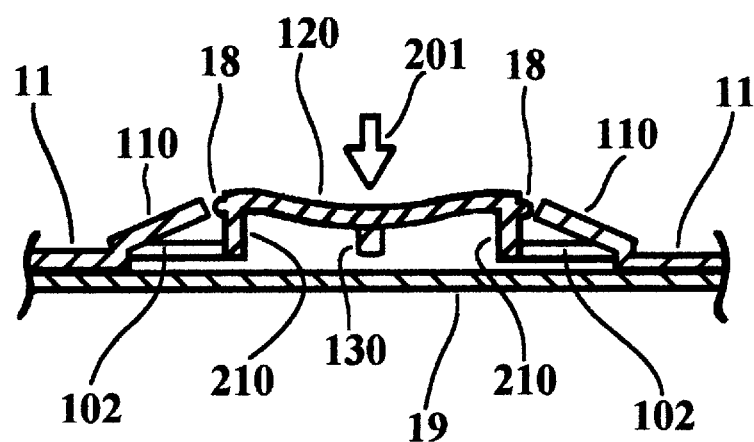
Fig. 5-B

LASER DISK HOLDER WITH ONE TOUCH DISK DEMOUNTING

FIELD OF THE INVENTION

This invention relates to a novel holding tray for a digital laser disk having a center circular opening. The novel holding tray is formed with integrated resilient laser disk lifting tabs and a center release button so as to enable the de-mounting of a laser disk which is mounted onto the novel holding tray with the application of a simple one touch pushing action.

DESCRIPTION OF THE PRIOR ART

Digital laser disks are commonly used to store various forms of digitized data such as digital audio, digital video, or digital code for electronic devices such as compact disk players, digital video recorders, and digital computers. These digital laser disks are typically formed from rigid polystyrene resin and are circular in form and are formed with a circular center opening. The laser disks are usually stored in hinged protective cases commonly known as "jewel boxes". Inside the jewel box, a holding tray with a center rosette assembly is typically used to retain the laser disk securely, and typically the laser disk is removed from the holding tray by means of a prying motion whereby an individual will grasp the edges of the laser disk and pry the laser disk free from the center rosette that the laser disk is mounted onto.

In general, the use of a prying motion to remove the laser disk from the holding tray is an effective means of demounting the laser disk, although with this and with other similar methods, some finite probability does exist that, through fumbling, the laser disk will be damaged. In addition, extracting the disk by means of prying may prove difficult for those individuals with limited manual dexterity, such as those afflicted with arthritis, or for those individuals who have small hands, such as children.

In order to facilitate the demounting of a laser disk from the laser disk holding tray various devices have been described by such inventors as Otsuka et al., Gelardi et al., Hummel Jr. et al., Ciba et al., and Bandy et al. In comparison to these prior art devices, the inventors herein propose an alternate device which will permit for the demounting of a laser disk with a simple one touch action, and which is relatively uncomplicated in its design and therefore relatively inexpensive to manufacture.

SUMMARY OF THE INVENTION

Accordingly then, the objects and advantages of the novel laser disk holder proposed and described herein are (a) to realize a laser disk holder which is relatively uncomplicated in its design and therefore relatively inexpensive to manufacture, (b) to realize a laser disk holder from which the laser disk can be demounted with the least amount of applied manual dexterity, preferably through the application of a simple one touch action, (c) to realize a laser disk holder whose design is compatible with the design of current art jewel boxes, (d) to realize a laser disk holder onto which a laser disk can be mounted firmly and securely.

Therefore, in keeping with the above stated objectives the inventors herein propose the novel laser disk holders that are described herein. Two preferred embodiments of the invention are described by this specification. Both of the preferred embodiments of the invention are designed for ease of manufacture and are to be preferably manufactured from resilient plastic resin compounds with standard injection molding techniques.

In the first preferred embodiment of the invention, the novel laser disk holder is comprised of a generally planar frame having a centrally located annular raised platform. Affixed centrally to the annular raised platform is a center rosette assembly which is comprised of a radial array of cranked resilient prawn elements. Each prawn element is comprised of a lower horizontal tab, a vertical riser tab, and an upper horizontal tab all joined so as to form a resilient cranked structure. A laser disk is retained in the novel laser disk holder by mounting the laser disk onto the center rosette assembly such that the center rosette assembly is fitted snugly into the center circular opening of the laser disk. The dimensions of the center rosette assembly are sized accordingly such that an interference fit is produced between the center rosette assembly and the center circular opening of the laser disk once the laser disk is mounted onto the center rosette assembly.

In order to provide for the demounting of a laser disk with a simple one touch action, the novel laser disk holder is also comprised of a multiple number of resilient laser disk lifting tabs, and of a center release button. In the first preferred embodiment of the invention the laser disk lifting tabs are affixed to the annular raised platform and extend inwardly from the upper surface of the raised annular platform with an upwards sloping bias. The center release button is concentric with the center rosette assembly and affixed to the innermost tips of the various prawn elements which comprise the center rosette assembly. The purpose of each laser disk lifting tab is to impose an upwards lifting force onto a laser disk which is mounted onto the center rosette assembly of the laser disk tray, and the purpose of the center release button is to provide a convenient means whereby each prawn element that is attached to the center release button may be cammed inwardly through the application of a downward pushing force onto the top surface of the center release button.

A laser disk is demounted from the novel laser disk holder through the application of a downwards pushing force onto the the top surface of the center release button. This downwards pushing force will cause the center release button to be displaced downwards, and will cause the various prawn elements which are affixed to the center release button to be cammed inwardly. Once these prawn elements are inwardly cammed by a sufficient degree, the interference fit which exists between the center rosette assembly and the center opening of the mounted laser disk is nullified, and the laser disk is then free to be urged away from the top surface of the laser disk holder by the resilient lifting action of the laser disk lifting tabs. In this manner, the novel laser disk holder provides for the convenient demounting of a laser disk that is mounted thereupon with the application of a simple one touch action.

Affixed to the lower surface of the center release button is a stroke limiting rod which functions to limit the downward displacement of the center release button and so prevents the structure of the center release button and of each prawn element that is affixed to the center release button from becoming damaged from excessive structural deformation due to the application of excessive downward force onto center the release button.

The design of the second preferred embodiment of the invention is similar to the design of the first preferred embodiment of the invention with the exception of the center rosette assembly, which, for the second preferred embodiment, is replaced by a cylindrical riser element. In all other respects, the design of the second preferred embodiment of the invention is similar to the design of the first preferred embodiment. Like the first preferred embodiment, the second preferred embodiment is comprised of a generally planar frame having a centrally located annular raised platform to which are affixed a multiple number of resilient laser disk lifting tabs. The cylindrical riser element is centrally affixed onto the raised annular platform, with a center release button being centrally affixed to the cylindrical riser element.

In the second preferred embodiment of the invention the cylindrical riser element performs the function performed by the center rosette assembly of the first preferred embodiment. In the second preferred embodiment of the invention, a laser disk is retained by mounting the laser disk onto the cylindrical riser such that the cylindrical riser is fitted snugly into the center circular opening of the laser disk. The dimensions of the cylindrical riser are sized accordingly such that an interference fit is produced between the outer sidewall of the cylindrical riser and the center circular opening of the laser disk once the laser disk is mounted onto the cylindrical riser.

A laser disk is demounted from the second preferred embodiment of the invention with a method that is similar to the method that is employed in the demounting of a laser disk from the first preferred embodiment of the invention. That is, a laser disk is demounted from the second embodiment through the application of a downwards pushing force onto the the top surface of the center release button. This downwards pushing force will cause the center release button to be displaced downwards, and will cause the outer sidewall of the cylindrical riser element to be cammed inwardly. Once the sidewall has been cammed inwardly by a sufficient degree, the interference fit which exists between the cylindrical riser and the center opening of the mounted laser disk is nullified, and the laser disk is then free to be urged away from the top surface of the laser disk holder by the resilient lifting action of the laser disk lifting tabs. In this manner, the second embodiment of the novel laser disk holder also provides for the convenient demounting of a laser disk that is mounted thereupon with the application of a simple one touch action.

The second preferred embodiment of the invention also incorporates a stroke limiting rod affixed to the lower surface of the center release button which functions to limit the downward displacement of the center release button and so prevents the structure of the center release button and of the cylindrical riser that is affixed to the center release button from becoming damaged from excessive structural deformation due to the application of excessive downward force onto the center release button.

A more detailed description of the preferred embodiments of the invention, of the laser disk demounting procedure and of various other aspects of the invention are provided by the insuing drawings and accompanying descriptions.

BRIEF DESCRIPTION OF THE DRAWINGS

FIG. 1-A shows a top plan view of a laser disk holding tray that is typical of the current art.

FIG. 1-B shows a cross-sectional view of the center rosette of the laser disk holding tray shown by FIG. 1-A along line 1—1 of FIG. 1-A.

FIG. 2-A shows a cross-sectional view of the laser disk holding tray shown by FIG. 1-A with a laser disk mounted thereupon along the line 1—1 of FIG. 1-A.

FIG. 2-B shows a more detailed cross-sectional view of the center rosette assembly with a laser disk mounted thereupon as d epic ted by FIG. 2-A.

FIG. 2-C shows the same cross-sectional view as shown by FIG. 2-B but now depicting the laser disk as it is demounted from the center rosette.

FIG. 3-A is a top plan view of the novel laser disk holder proposed by the inventors.

FIG. 3-B is a cross-sectional view of the novel laser disk holder shown by FIG. 3-A along line 3—3 of FIG. 3-A.

FIG. 4-A is a cross-sectional view of the novel laser disk holder shown by FIG. 3-A along line 3—3 of FIG. 3-A, but now also showing the cross section of a laser disk which is about to be mounted thereupon.

FIG. 4-B is a cross-sectional view of the novel laser disk holder shown by FIG. 3-A along line 3—3 of FIG. 3-A, but now also showing the cross section of a laser disk which is mounted thereupon.

FIG. 4-C is a cross-sectional view of t he novel laser disk holder shown by FIG. 3-A along line 3—3 of FIG. 3-A, but now also showing the cross section of a laser disk which is about to be de-mounted from thereupon.

FIG. 4-D is a cross-sectional view of the novel laser disk holder shown by FIG. 3-A along line 3—3 of FIG. 3-A, but now also showing the cross section of a laser disk which has been de-mounted from thereupon.

FIG. 5-A is a top plan view of an alternate embodiment of of the novel laser disk holder.

FIG. 5-B is a cross-sectional view of the alternate embodiment of the novel laser disk holder shown by FIG. 5-A along line 5—5 of FIG. 5-A.

DESCRIPTION OF THE PREFERRED EMBODIMENTS

Referring now to the drawings, FIG. 1-A shows a top plan view of a laser disk holder 10 that is typical of the type that is found in most laser disk jewel boxes of currently popular design. In general, laser disk holder 10 is formed of a resilient plastic polymer and consists of a flat annular tray 11, a raised center annular platform 12, and a center rosette 13, which is comprised of a circular array of a multiple number of inwardly curved resilient prawn elements 14. The outer peripheri of laser disk holder 10 is typically formed as a square with dimensions sized so as to conform to the inner dimensions of a laser disk jewel box. Optional finger indents 15 may also be integrated into the structure of laser disk holder 10 so as to provide a means for facilitating the removal of a laser disk that is mounted onto laser disk holder 10.

FIG. 1-B shows a cross-section of laser disk holder 10 along the line 1—1 shown in FIG. 1-A. As FIG. 1-B indicates, center annular platform 12 defines an annular platform area which rises above the plane of annular tray region 11. The joining of center annular platform 12 with annular tray 11 occurs coincident with the inner peripheri of annular tray 11 and the outer peripheri of center annular platform 12. Affixed to the inner peripheri of center annular platform 12 is a multiple number of prawn elements 14 arranged in a radial manner so as to comprise center rosette 13. Each prawn element 14 is comprised of a lower horizontal tab 15, a vertical riser tab 16, and an upper horizontal tab 17 all joined so as to form the cranked structure that is shown. A protrusion 18 may be formed onto the topmost part of the outer sidewall of each verticle riser tab 16 in order to enhance the laser disk retaining capability of center rosette 13.

Finally, FIG. 1-B shows a lower adjacent panel 19 which resides against the lower surface of laser disk holder 10. Typically lower adjacent panel 19 will be entity of the structure of the laser disk jewel box into which laser disk holding tray 10 is mounted.

FIG. 2-A shows a cross sectional view along line 1—1 of FIG. 1-A of laser disk holder 10 with a laser disk 20 that has been mounted thereupon. As FIG. 2-A indicates, laser disk 20 is mounted onto laser disk holder 10 by fitting the center circular opening of laser disk 20 onto center rosette 13 such that an interference fit is produced between the center circular opening of laser disk 20 and the circular array of prawn elements 14 that comprise center rosette 13. With the laser disk so mounted, the center non-information bearing region of laser disk 20 will be in contact with the top surface of raised center annular platform 12 of laser disk holder 10 while the information bearing region of the laser disk will normally remain suspended above annular tray 11 without making contact with the top surface of annular tray region 11.

In order to de-mount laser disk 20 from laser disk holder 10 an individual will typically grasp laser disk 20 at its peripheral edges with the fingers of one hand while holding laser disk holder 10 with the alternate hand, and then de-mount laser disk 10 by forcibly lifting or prying laser disk 10 free from center rosette 13. This lifting force is represented in FIG. 2-A by arrows 21.

FIG. 2-B shows the center region of FIG. 2-A in closer detail. As FIG. 2-B indicates, laser disk 20 is held securely onto laser disk holder 10 by the resilient spring action of prawn elements 14 which form an interference fit between the circular center opening of laser disk 20 and the outer sidewall of each vertical riser tab 16 of each individual prawn element 14. To insure that an adequate interference fit results once laser disk 20 is mounted onto center rosette 13, the diameter 22 of center rosette 13, as measured from the outer sidewalls of the verticle riser tabs 16 of two diametrically opposed prawn elements 14, is chosen so as to be slightly greater than the diameter of the center opening of laser disk 20. In this manner, an interference fit is generated between the center opening of laser disk 20 and center rosette 13 once laser disk is mounted onto center rosette 13, and once a proper interference fit is generated, laser disk 20 remains securely mounted onto center rosette 13. To further insure a secure mounting of laser disk 20 onto center rosette 13, protrusions 20 may be formed onto the topmost part of the outer sidewall of each verticle riser tab 16. Each protrusion 20 will enhance the laser disk retaining capability of center rosette 13 by exerting an additional downwards retaining force onto the top surface of laser disk 20 once laser disk 20 is mounted onto center rosette 13.

Like FIG. 2-B, FIG. 2-C also shows the center region of FIG. 2-A in closer detail, but now indicating the state of laser disk 20 under the application of the demounting force represented by arrows 21 of FIG. 2-A. As FIG. 2-C indicates, when demounting laser disk 20 in the typical fashion, the lifting force 21 that is applied to the peripheral edges of laser disk 20 will cause the structure of laser disk 20 to bend upwards until lifting force 21 is of a sufficient magnitude that laser disk 20 is then pryed free from the interference fit which exists between the center opening of laser disk 20 and center rosette 13. Since the structure of laser disk 20 is bent using this demounting procedure, it is conceivable that the repeated demounting of laser disk 20 in this manner will result in a degradation in the longevity of laser disk 20 due to repeated structural fatigue.

FIG. 3-A shows a top plan view of the novel laser disk holder 100. In the preferred embodiment, novel laser disk holder 100, like laser disk holder 10, is formed of a resilient plastic polymer and consists of a flat annular tray 11 as found in laser disk holder 10, a raised novel center annular platform 102, and a novel center rosette 103, which is comprised of a circular array of a multiple number of inwardly curved resilient prawn elements 14 as are found in laser disk holder 10. Like laser disk holder 10, the outer peripheri of novel laser disk holder 100 is formed as a square with dimensions size so as to conform to the inner dimensions of a laser disk jewel box, also like laser disk holder 10, optional finger indents 15 may also be integrated into the structure of novel laser disk holder 100 so as provide a means for facilitating the removal of a laser disk that is mounted onto novel laser disk holder 100.

In order to provide for the de-mounting of a laser disk with a simple one touch action, novel laser disk holder 100 is also comprised of a multiple number of laser disk lifting tabs 110, and a center release button 120. In the preferred embodiment laser disk lifting tabs 110 are affixed to and extend inwardly from the upper surface of novel center annular platform 102, and center release button 120 is concentric with and affixed to a multiple number of prawn elements 14 of novel center rosette 103. The function of each laser disk lifting tab 110 is to impose an upwards lifting force onto a laser disk which is mounted onto novel center rosette 103 of novel laser disk holder 100, and the function of center release button 120 is to provide a convenient means whereby each prawn element 14 that is attached to center release button 120 can be cammed inwardly by means of the application of a downwards pushing force that is applied onto the top surface of center release button 120.

As further indicated by FIG. 3-A, in the preferred embodiment a multiple number of laser disk lifting tabs 110 are arranged into a circular array that is concentric with novel center rosette 103. Cutout regions 111 are provided into the structure of novel center annular platform 102, with each cutout region 111 sized to fully encompass the designated shape of each laser disk lifting tab 110 so as to permit the top surface of each laser disk lifting tab 110 to become flush with the top surface of annular platform 102 once each laser disk lifting tab 110 is cammed sufficiently downwards.

FIG. 3-B shows a cross section of novel laser disk holder 100 along the line 3—3 indicated in FIG. 3-A. From this cross-sectional view, the function of the various elements can be described in more detail. As FIG. 3-B indicates, each laser disk lifting tab 110 is affixed to novel center annular platform 102 and extends inwardly towards the center of novel laser disk holder 100. For proper design, laser disk lifting tabs 110 are formed of a flexible, resilient material such as resin plastic, and are formed so as to extend inwardly and with an upwardly sloping bias. When so formed, laser disk lifting tabs 110 will function to urge a laser disk which is mounted onto novel center rosette 103 in an upwards direction away from the upper surface of novel center annular platform 102.

Affixed to novel center annular platform 102 is a multiple number of prawn elements 14 arranged in a circular array so as to form novel center rosette 103. Each prawn element 14 is formed of a lower horizontal tab 15, a vertical riser tab 16, and an upper horizontal tab 17 all joined so as to form the cranked structure that is shown. A protrusion 18 may also be formed onto the topmost part of the outer sidewall of each verticle riser tab 16 in order to enhance the laser disk retaining capability of novel center rosette 103. Similar to the operation of laser disk holder holder 10, a laser disk is retained onto novel laser disk holder 100 by mounting the laser disk onto novel center rosette 103, and similarly, for proper design, the diameter of novel center rosette 103, as measured from the outer sidewalls of the verticle riser tabs 16 of two diametrically opposed prawn elements 14, is chosen to be slightly greater than the diameter of the center opening of a laser disk such that an interference fit will result between novel center rosette 103 and the center opening of a laser disk once the laser disk is mounted onto center rosette 103.

Each prawn element 14 is formed from a resilient material such as resin plastic which will allow each prawn element 14 to be cammed inwardly. In order to facilitate the inward camming of each prawn element 14, novel laser disk holder 100 includes center release button 120. As FIG. 3-B indicates, center release button 120 is affixed to each prawn element 14 at the innermost tip of each upper horizontal tab 17. In practice, center release button 120 is integrally molded with the structure of each upper horizontal tab 17 and flexibly attached so as to provide a means whereby each prawn element 14 can be cammed inwardly through the application of a downwards pushing force applied to the top surface of center release button 120. Affixed to the lower surface of center release button 120 is a stroke limiting rod 130, which functions to limit the maximum downward displacement of center release button 120 and so prevent the structure of center release button 120 and of each prawn element 14 that is attached to center release button 120 from becoming damaged from structural deformation through the application of excessive downward force onto center release button 120.

FIGS. 4-A through 4-D describe the process by which a laser disk is mounted onto and de-mounted from novel laser disk holder 100.

Referring now to FIG. 4-A, a cross-section of novel laser disk holder 100 is shown. The cross-sectional view shown by FIG. 4-A is taken along the line 3—3 of FIG. 3-A. Also shown in FIG. 4-A is the cross section of laser disk 20 which is in the process of being mounted onto novel center rosette 103. Arrows 104 indicates the direction of the force that is applied to laser disk 20 in order to mount laser disk 20 onto novel center rosette 103. As FIG. 4-A indicates, prior to the mounting of laser disk 20 onto novel center rosette 103, each laser disk lifting tab 110 extends upwardly in an unbiased position. Similarly, with laser disk 20 not mounted onto novel center rosette 103, each prawn element 14 remains in its unbiased position.

FIG. 4-B shows the same cross sectional view as in FIG. 4-A but now showing laser disk 20 after having been mounted onto novel center rosette 103. In this configuration, laser disk 20 is now securely retained onto novel center rosette 103 by the interference fit which exists between the center opening of laser disk 20 and the outer vertical sidewall of each verticle riser tab 16. With laser disk 20 so mounted onto novel center rosette 103, each laser disk lifting tab 110 of novel laser disk holder 100 is displaced from its unbiased position and is now biased such that the upper face of each laser disk lifting tab 110 is in contact with the lower face of laser disk 20. When so biased, each laser disk lifting tab 110, which is formed of a resilient elastic material, will now exert an upward lifting force onto the lower face of laser disk 20. Under these conditions, laser disk 20 will remain mounted onto novel center rosette 103 through the retaining force which is provided by the interference fit which exists between the center opening of laser disk 20 and novel center rosette 103. Also aiding in the retention of laser disk 20 onto novel center rosette 103 are protrusions 20 which are located onto the outer sidewall of each individual verticle riser tab 16, and which exert an additional downwards retaining force onto the top surface of laser disk 20 once laser disk 20 is mounted onto novel center rosette 103. For proper design, the upward lifting force which laser disk lifting tabs 110, once downwardly biased, exert onto the lower face of laser disk 20 should not be sufficient to overcome the retaining force which is provided by the interference fit which exists between the center opening of laser disk 20 and novel center rosette 103. In this manner then, laser disk 20 will remain mounted onto center rosette 103 even though the resilient structure of each laser disk lifting tab 110 has been biased away from its at rest posture.

FIG. 4-C shows the same cross sectional view as in FIG. 4-A but now showing laser disk 20 in the process of being de-mounted from and lifted above novel center rosette 103 through the action of the center release button 120 and laser disk lifting tabs 110 respectively. As indicated by FIG. 4-C, laser disk 20 is de-mounted by a simple one touch action through the application of a downward pushing force, as represented by arrow 105, onto the upper surface of center release button 120. Since center release button 120 is attached to each upper horizontal tab 17 of each prawn element 14 the application of downward force 105 onto the upper surface of center release button 120 will produce an inward camming of each of the individual prawn elements 14 of novel center rosette 103. Once each, or a sufficient number of individual prawn elements 14 are cammed inwards sufficiently, the interference fit which exists between the center opening of laser disk 20 and novel center rosette 103 is nullified. Similarly, once each, or a majority, of the individual prawn elements 14 are cammed inwards, each protrusion 18 will be displaced inwardly and away from the center opening of laser disk 20, thus nullifying the retaining force that protrusions 18 exert onto laser disk 20. With both of these forementioned retaining forces now nullified, laser disk 20 is now demounted from novel center rosette 103 and is urged away from the top surface of novel center annular platform 102 in the direction that is indicated by arrows 106. In this manner laser disk 20 is de-mounted from novel laser disk holder 100 with the application of a simple one touch action, and in a manner that does not bend or warp the structure of laser disk 20.

Also indicated by FIG. 4-C is the function of stroke limiting rod 130 during the laser disk de-mounting operation. When laser disk 20 is de-mounted from novel laser disk holder 100, stroke limiting rod 130 will come into contact with lower adjacent surface 19 once a predetermined downward displacement of center release button 120 has been achieved. In this manner, the maximum achievable downward displacement of center release button 120 is limited by stroke limiting rod 130 such that the structure of center release button 120 and of each prawn element 14 to which center release button 120 is attached do not incur damage from excessive structural deformation resulting from an excessive downward displacement of center release button 120.

FIG. 4-D shows the same cross sectional view as in FIG. 4-A but now showing laser disk 20 after having been de-mounted. Once de-mounted, laser disk 20 is supported above the height of novel center rosette 103 by the supporting action of laser disk lifting tabs 110. After laser disk 20 is de-mounted, a downward pushing force need no longer be applied to the upper surface of center release button 120 and so individual prawn elements 14 of novel center rosette 103 are no longer cammed inwards but are now free to return to their unbiased posture. However, due to the lifting action provided by laser disk lifting tabs 110, laser disk 20 now remains supported at a level above the height of novel center rosette 103 and so does not become accidentally re-mounted onto novel center rosette 103 once prawn elements 14 resume their unbiased posture. With laser disk 20 now so positioned, it is available to be easily grasped and removed from novel laser disk holder 100 by an individual with a minimum amount of fumbling.

FIG. 5-A shows an alternate embodiment of the novel laser disk holder wherein the center rosette element has now been replaced with a cylindrical riser element. Rather than being mounted onto novel center rosette 103 as is the case with novel laser disk holder 100, in the alternate novel laser disk holder 200, laser disk 20 is mounted onto cylindrical riser 210 when laser disk 20 is being retained by alternate novel laser disk holder 200.

As FIG. 5-A indicates, the structure of alternate novel laser disk holder 200 is very similar to the structure of novel laser disk holder 100. Like novel laser disk holder 100, alternate novel laser disk holder 200 is also comprised of flat circular tray 11, raised novel center annular platform 102, a multiple number of laser disk lifting tabs 110, a multiple number of cutout regions 111, and a center release button 120.

Likewise, a laser disk is de-mounted from alternate novel laser disk holder 200 in a manner similar to that used to de-mount a laser disk from novel laser disk holder 100. That is, the laser disk is demounted through the application of a downward pushing force onto the upper surface of laser disk release button 120, after which the laser disk is urged away from novel center annular platform 102 by the resilient lifting action of laser disk lifting tabs 110.

FIG. 5-B shows a cross-sectional view of alternate novel laser disk holder 200 along line 5—5 indicated by FIG. 5-A.

As FIG. 5-B indicates, laser disk lifting tabs 110 are affixed to novel center annular platform 102 and extend inwardly towards the center of alternate novel laser disk holder 200. In practice, laser disk lifting tabs 110 are formed of a flexible, resilient material such as resin plastic, and are formed so as to extend inwardly and with an upwardly sloping bias. When so formed, laser disk lifting tabs 110 will act to urge any laser disk which is mounted onto cylindrical riser 210 in an upwards direction away from the top surface of novel center annular platform 102.

Also affixed to novel center annular platform 102, is cylindrical riser 210. As FIG. 5-B indicates, cylindrical riser 210 is affixed concentrically onto novel center annular platform 102 and extends upwards from novel center annular platform 102. For proper design, cylindrical riser 210 has a hollow structure and is formed from a flexible, resilient material such as resin plastic. In order to securely retain a laser disk which is mounted onto cylindrical riser 210, the outer diameter of cylindrical riser element 210 must be sized slightly greater than the diameter of the center opening of the laser disk such that an interference fit will then result between the outer sidewall of cylindrical riser 210 and the center opening of the laser disk once the laser disk is mounted onto cylindrical riser 210. Similar to the design of novel center rosette 103, it is also possible to enhance the laser disk retaining capability of cylindrical riser 210, through the inclusion of protrusions 18 into the structure of the outer sidewall of cylindrical riser 210.

Affixed concentrically to cylindrical riser 210, at that end of cylindrical riser 210 that is not affixed to novel center annular platform 102, is center release button 120. Affixed to the lower surface of center release button 120 is stroke limiting rod 130, which functions to limit the maximum achievable downward displacement of center release button 120 by coming into contact with the upper surface of lower adjacent panel 19 once center release button 120 has been displaced downward sufficiently.

For proper operation, center release button 120 is also formed from a resilient material such as resin plastic, and, likewise to novel laser disk holder 100, a laser disk which is mounted onto alternate novel laser disk holder 200 is de-mounted from alternate novel laser disk holder 200 through the application of a downward pushing force onto the upper surface of center release button 120. This downward pushing force, as represented by arrow 201 that is shown in FIG. 5-B, will downwardly displace center release button 120 and thus cause the sidewall of cylindrical riser 210 to bend inwardly, thus reducing the effective diameter of cylindrical riser 210. Once the effective diameter of cylindrical riser 210 is reduced sufficiently, the interference fit which exists between the outer sidewall of cylindrical riser 210 and the center opening of a laser disk which is mounted onto cylindrical riser 210 will be nullified, and once this interference fit is nullified, the laser disk is then lifted upwards and away from center platform 102 by the lifting action of laser disk lifting tabs 110. Thus, similar to novel laser disk holder 100, a laser disk may be de-mounted from alternate laser disk holder 200 through the application of the same simple one touch action.

The procedure for mounting a laser disk onto and de-mounting a laser disk from alternate novel laser disk holder 200 is identical to the mounting and de-mounting procedure that is used for novel laser disk holder 100 as depicted by FIG. 4-A, FIG. 4-B, FIG. 4-C, and FIG. 4-D, and so will not be described again for purposes of brevity.

Accordingly, it can be seen that the novel laser disk holders described herein provide a convenient means for an individual to easily de-mount a laser disk with a simple one touch action and with minimal fumbling of the laser disk. Also, it can be seen that the form of the invention is such that it is easily manufacturable and can be easily incorporated into the design of laser disk holding trays that are popular in the current art.

Although the preceding description contains various specificities, these should not be construed as limiting the scope of the invention but as merely providing an example of the preferred embodiment of this invention. Many modifications, alterations and changes will become apparent to those skilled in the art to which this invention pertains. Thus the scope of this invention should be determined by the appended claims and their legal equivalents, rather than by the embodiment described herein.

The inventors claim:

1. A tray for retaining a digital media laser disk, said laser disk having a center circular opening, and said tray comprising:

a generally planar molded resilient frame for nesting said laser disk thereupon, a rosette assembly located centrally to said frame, and at least a single resilient tabular arm affixed to a surface of said frame, a rosette assembly sized so as to be appropriate for the retention of a laser disk having a center circular opening, said rosette assembly affixed to a first surface of said frame, said rosette assembly comprised of a multiple number of resilient cranked elements and of a center button element, said cranked elements being arranged in a generally radial manner, each of said cranked element formed by the union of a lower horizontal tab, a vertical riser tab, and an upper horizontal tab, said lower horizontal tab being affixed to said frame, said lower horizontal tab extending inwardly towards the center of said frame, lower end of said vertical riser tab being affixed to the innermost end of said lower horizontal tab, said verticle riser tab extending upwards generally perpendicular to said lower horizontal tab, one end of said upper horizontal tab being affixed to the uppermost end of said verticle riser tab, second end of said upper horizontal tab being affixed to the peripheri of said center button element, said center button element being centrally located to the radial array of said cranked elements, said center button element being affixed to at least two of said upper horizontal tabs of two of said cranked elements, said center button element acting to produce an inward camming of said cranked elements to which said center button element is affixed as the result of the application of a downward pushing force onto the upper surface of said center button element, said resilient tabular arm affixed to said first surface of said frame, said resilient tabular arm being cantilevered upwards and away from said first surface of said frame, said resilient tabular arm positioned so as to contact the lower surface of said laser disk which is mounted onto said rosette assembly of said tray, said resilient tabular arm acting to urge said laser disk which is mounted onto said rosette of said tray away from said first surface of said frame.

2. The invention of claim 1 whereby protruding nubs are formed into the outer surface of at least a single said verticle riser tab, said nubs functioning to more securely retain a laser disk which is mounted onto said center rosette.

3. The invention of claim 1 whereby the structure of at least a single of said verticle riser tab is curved inwardly, said curving of said verticle riser tab functioning to more securely retain a laser disk which is mounted onto said center rosette.

4. The invention of claim 1 whereby a stroke limiting rod element is affixed to the lower surface of said center button element, and whereby a second planar frame resides adjacent to the lower surface of said frame and is rigidly affixed thereto, said rod element protruding downwards from the lower surface of said center button element, said rod element functioning to limit the downward displacement of said center button element by contacting the upper surface of said second frame once a predetermined downward displacement of said center button element is achieved.

5. The invention of claim 1 wherein said tray is formed of transparent material.

6. The invention of claim 1 wherein said tray is formed of a translucent material.

7. A tray for retaining a digital media laser disk, said laser disk having a center circular opening, and said tray comprising:

a generally planar molded resilient frame for nesting said laser disk thereupon, a cylindrical riser located centrally to said frame, a center button element centrally affixed to said cylindrical riser, and at least a single resilient tabular arm affixed to said first surface of said frame, said cylindrical riser sized so as to be appropriate for the retention of a laser disk having a central opening, said cylindrical riser having a diameter which is sufficient for producing an interference fit with the center opening of a laser disk which is mounted onto and concentric with said cylindrical riser, said cylindrical riser forming an annulus with a hollow structure, said cylindrical riser having a resilient structure, said cylindrical riser being affixed at lower end of said cylindrical riser to said first surface of said frame, said center button element being centrally located to said cylindrical riser, said center button element being affixed to the upper end of said cylindrical riser coincident with the upper circular peripheri of said cylindrical riser, said center button element acting to produce an inward camming of the sidewall of said cylindrical riser as the result of the application of a downward pushing force onto the upper surface of said center button element, said resilient tabular arm affixed to said first surface of said frame, said resilient tabular arm being cantilevered upwards and away from said first surface of said frame, said resilient tabular arm positioned so as to contact the lower surface of said laser disk which is mounted onto said cylindrical riser of said tray, said resilient tabular arm acting to urge said laser disk which is mounted onto said cylindrical riser of said tray away from said surface of said frame.

8. The invention of claim 7 whereby protruding nubs are formed into the outer surface of said cylindrical riser, said nubs functioning to more securely retain a laser disk which is mounted onto said cylindrical riser.

9. The invention of claim 7 whereby the sidewall of said cylindrical riser is curved inwardly, said curving of said sidewall functioning to more securely retain a laser disk which is mounted onto said cylindrical riser.

10. The invention of claim 7 whereby a stroke limiting rod element is affixed to the lower surface of said center button element, and whereby a second planar frame resides adjacent to the lower surface of said frame and is rigidly affixed thereto, said rod element protruding downwards from the lower surface of said center button element, said rod element functioning to limit the downward displacement of said center button element by contacting the upper surface of said second frame once a predetermined downward displacement of said center button element is achieved.

11. The invention of claim 7 wherein said tray is formed of transparent material.

12. The invention of claim 7 wherein said tray is formed of a translucent material.

13. The invention of claim 7 wherein cutout regions are incorporated into the structure of said cylindrical riser, said cutout regions acting to enhance the flexibility of said cylindrical riser.

* * * * *